(12) United States Patent (10) Patent No.: US 12,322,765 B2
Youn et al. (45) Date of Patent: Jun. 3, 2025

(54) BATTERY SYSTEM AND BATTERY MODULE EVALUATION METHOD CAPABLE OF DETECTING DAMAGED BATTERY CELL

(71) Applicant: LG ENERGY SOLUTION, LTD., Seoul (KR)

(72) Inventors: Ha Eun Youn, Daejeon (KR); Hyung Jin Hwang, Daejeon (KR); Seong Ha Cha, Daejeon (KR); Ui Yong Jeong, Daejeon (KR); In Cheol Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 547 days.

(21) Appl. No.: 17/788,439

(22) PCT Filed: Jul. 20, 2021

(86) PCT No.: PCT/KR2021/009357
§ 371 (c)(1),
(2) Date: Jun. 23, 2022

(87) PCT Pub. No.: WO2022/045589
PCT Pub. Date: Mar. 3, 2022

(65) Prior Publication Data
US 2023/0040106 A1 Feb. 9, 2023

(30) Foreign Application Priority Data

Aug. 31, 2020 (KR) .......................... 10-2020-0109975
May 27, 2021 (KR) .......................... 10-2021-0068005

(51) Int. Cl.
*H01M 10/42* (2006.01)

(52) U.S. Cl.
CPC ..... *H01M 10/425* (2013.01); *H01M 10/4285* (2013.01); *H01M 2010/4271* (2013.01)

(58) Field of Classification Search
CPC ........... H01M 10/425; H01M 10/4285; H01M 2010/4271
(Continued)

(56) References Cited

U.S. PATENT DOCUMENTS

2010/0255368 A1  10/2010  Park et al.
2018/0062210 A1  3/2018  Kim
(Continued)

FOREIGN PATENT DOCUMENTS

CN      109030606 A   12/2018
CN      110741419 A   1/2020
(Continued)

OTHER PUBLICATIONS

Extended European Search Report issued May 2, 2024 for European Patent Application No. 21861888.2.
(Continued)

*Primary Examiner* — Nathaniel R Pelton
(74) *Attorney, Agent, or Firm* — Morgan, Lewis & Bockius LLP (57) ABSTRACT

The present invention relates to a battery system for detecting a damaged battery cell, and a method of evaluating a battery module. The battery system and the apparatus for evaluating performance of the battery module can accurately predict the location of the battery cell where gas has been generated by introducing a plurality of gas sensor units in the battery module where a plurality of battery cells are accommodated, and comparing gas detection time points measured in the gas sensor units when gas is generated in a battery cell. Hence, the battery system and the apparatus for evaluating performance of the battery module can be usefully used in (Continued)

terms of development of a battery module and/or management of a developed battery module.

15 Claims, 6 Drawing Sheets

(58) Field of Classification Search
    USPC ............................................................ 320/134
    See application file for complete search history.

(56) References Cited

U.S. PATENT DOCUMENTS

| | | |
|---|---|---|
| 2018/0208074 A1 | 7/2018 | Lee et al. |
| 2018/0299417 A1 | 10/2018 | Cha et al. |
| 2018/0356364 A1 | 12/2018 | Okamoto et al. |
| 2018/0370366 A1 | 12/2018 | Suzuki et al. |
| 2020/0112016 A1 | 4/2020 | Erhart |
| 2020/0116685 A1 | 4/2020 | Wei et al. |
| 2020/0256921 A1 | 8/2020 | Hwang et al. |
| 2020/0266405 A1 | 8/2020 | Pokora |
| 2020/0350638 A1 | 11/2020 | Hwang et al. |
| 2020/0386816 A1* | 12/2020 | Jeong ................. G01R 31/2872 |
| 2021/0257678 A1* | 8/2021 | Schmidt .............. H01M 10/486 |

FOREIGN PATENT DOCUMENTS

| | | |
|---|---|---|
| CN | 111426660 A | 7/2020 |
| CN | 111587569 A | 8/2020 |
| EP | 3300162 A1 | 3/2018 |
| EP | 3686595 A1 | 7/2020 |
| JP | 2012-110129 A | 6/2012 |
| JP | 6521097 B2 | 5/2019 |
| KR | 10-0959090 B1 | 5/2010 |
| KR | 10-2012-0111080 A | 10/2012 |
| KR | 10-1419570 B1 | 7/2014 |
| KR | 10-2017-0055216 A | 5/2017 |
| KR | 10-2018-0024545 A | 3/2018 |
| KR | 10-2018-0076578 A | 7/2018 |
| KR | 10-2045489 B1 | 11/2019 |
| KR | 10-2019-0134179 A | 12/2019 |
| KR | 10-2019-0139122 A | 12/2019 |
| KR | 10-2051810 B1 | 12/2019 |
| KR | 10-2020-0040190 A | 4/2020 |
| KR | 10-2116720 B1 | 5/2020 |
| KR | 10-2020-0084530 A | 7/2020 |

OTHER PUBLICATIONS

International Search Report (with partial translation) and Written Opinion dated Nov. 1, 2021 issued in corresponding International Patent Application No. PCT/KR2021/009357.
Office Action dated Apr. 7, 2025 issued in the counterpart Chinese Patent Application No. 202180007305.3.

* cited by examiner

BATTERY SYSTEM AND BATTERY MODULE EVALUATION METHOD CAPABLE OF DETECTING DAMAGED BATTERY CELL

TECHNICAL FIELD

The present invention relates to a battery system for detecting a damaged battery cell, and a method of evaluating a battery module. This application claims the benefit of priority based on Korean Patent Application No. 10-2020-0109975 filed on Aug. 31, 2020 and Korean Patent Application No. 10-2021-0068005 filed on May 27, 2021, and the content of these Korean Patent Applications are incorporated herein as part of the present specification.

BACKGROUND ART

A secondary battery is formed in a structure such that an electrode assembly including a positive electrode, a negative electrode, and a separator disposed therebetween is built in a battery case, and positive and negative electrode tabs are welded to two electrode leads and are sealed to be exposed to the outside of the battery case. The electrode tab is electrically connected to the external device through contact with the external device, and the secondary battery supplies power to the external device through the electrode tab or receives power from the external device.

If the battery is operated in an abnormal state by overcharge, overdischarge, overheating, and external impact, etc., gas may be generated inside the secondary battery. For example, the overheated battery generates gas inside, and the gas thus generated is pressurized from the inner side of the case, further promoting the decomposition reaction of each battery element inserted into the case, causing continuous overheating and gas generation. As such, a swelling phenomenon may occur. This phenomenon also appears in the slow deterioration process of secondary batteries due to long-term use. As such, in order to develop a battery cell having uniform charge/discharge characteristics, information on the pressure change according to the volume change of the battery cell according to a long time use or charge/discharge of the battery cell is necessary, and there is a need for a technology for monitoring the volume change or pressure change, etc. in real time in an aspect of improving the lifespan and efficiency at the time of using a developed battery cell.

Figure 1:
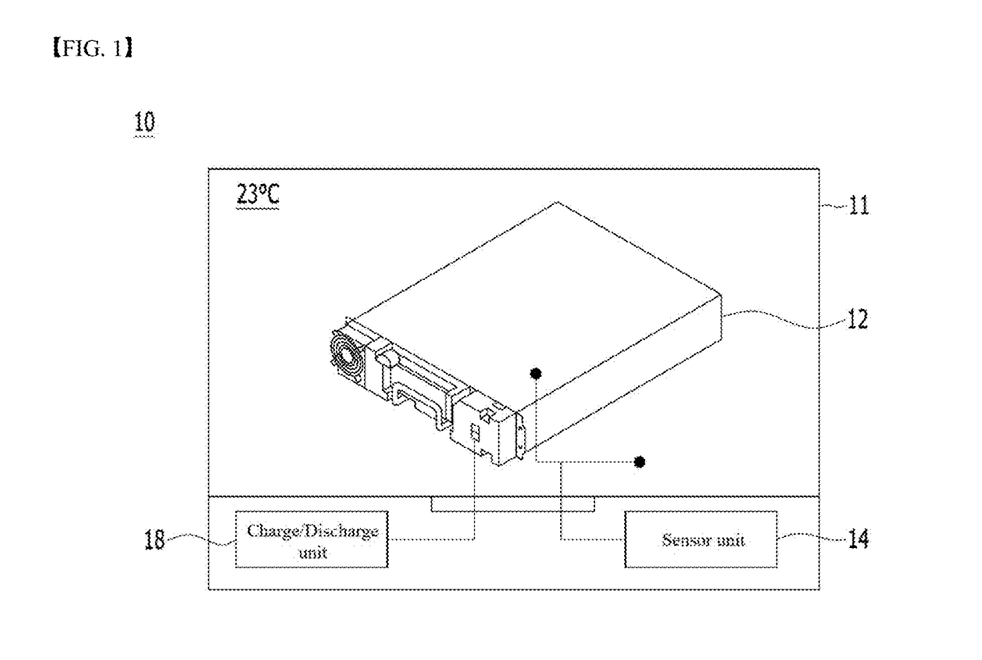
FIG. 1 is a diagram showing a conventional system for sensing characteristics of a battery module.

FIG. 1 is a diagram showing a system for sensing characteristics of a battery module having battery cells mounted thereon according to a conventional art. Referring to FIG. 1, the system 10 stores a battery module 12 which accommodates n battery cells in a chamber 11, and then repeatedly performs charge/discharge for battery cells accommodated in the battery module 12 by a charge/discharge unit 180, to thereby induce a swelling. Further, it is determined whether there has been a swelling in the battery cells through sensor units 14 which are separately installed in the chamber 11 and the battery module 12, or the battery module 12 is collected and disassembled to directly check whether there has been a swelling.

However, the system 10 cannot remotely detect whether a swelling has occurred in the battery cells accommodated in the battery module, and the inspection method of collecting and disassembling the battery module is inconvenient and requires a long time.

PRIOR ART LITERATURE

Patent Document

Japanese Patent Publication No. 2012-110129

DISCLOSURE

Technical Problem

As such, an object of the present invention is to provide a system and method for obtaining information for a pressure change according to the volume change of battery cells according to the use or charge/discharge of the battery cells mounted on a battery module for a long time.

Technical Solution

In order to solve the above-described problems, in an embodiment of the present invention, there is provided a battery system including a battery module, and a battery management system (BMS) configured to control an operation and a state of the battery module,
wherein the battery module includes a plurality of battery cells, a module case for accommodating the battery cells, and a plurality of gas sensor units which are separately positioned on an inner surface of the module case, sense gas generated from the battery cells during charge and discharge, and measure a gas detection time, and
wherein the battery management system (BMS) is electrically connected to the gas sensor units to receive information measured from each of the gas sensor units, and compares the received information to thereby calculate a position of a cell where the gas has been generated.

Herein, each of the gas sensor units further may measure at least one selected from the group consisting of a gas type and a gas concentration value.

Further, the battery management system (BMS) may receive measurement values from the gas sensor units which are separately positioned, and compare the received values to thereby calculate the position of the cell where gas has been generated, and the battery management system (BMS) may inform a user of a damage of a battery cell if a value measured in the gas sensor unit reaches a predetermined value.

Further, the module case may include a plurality of gas discharge units, and the gas sensor unit may be individually arranged at a position adjacent to each gas discharge unit.

Specifically, the gas discharge unit may include a first gas discharge unit positioned at a first side surface of the module case, and a second gas discharge unit positioned at a second side surface facing the first side surface.

Further, the battery system may further include an isolation resistance sensor unit which is positioned at an inner surface of the module case, measures an isolation resistance of the battery module, and transmits a measurement value to the battery management system (BMS).

In addition, the battery system may be a battery pack for a vehicle or an energy storage system (ESS).

Further, in an embodiment of the present invention, there is provided an apparatus for evaluating performance of a battery module, the apparatus including: a chamber;
a temperature controller which is positioned inside the chamber and controls an average temperature of an inside of the chamber to be in a range of 60 to 100° C.;

a battery module including a module case, which is mounted inside the chamber and accommodates a plurality of battery cells, and a plurality of gas sensor units which are separately positioned on an inner surface of the module case, sense gas generated inside the module case, and measure a gas detection time; and a data processing unit which is electrically connected to the plurality of gas sensor units, receives gas detection time measured by each of the gas sensor units, and compares the received gas detection time, to thereby predict a damaged battery cell among the plurality of battery cells.

Herein, the battery module may include a first gas discharge unit and a second gas discharge unit on a side surface of the module case, and first and second gas sensor units may be arranged on the first gas discharge unit and the second gas discharge unit, respectively.

Specifically, the first gas discharge unit may be formed on a first side surface of the battery module, and the second gas discharge unit may be formed on a second side surface facing the first side surface.

Further, the apparatus may further include an isolation resistance sensor unit which is positioned on an inner surface of the module case, measures an isolation resistance of the battery module, and transmits a measured isolation resistance value to the electrically connected data processing unit.

Further, in an embodiment of the present invention, there is provided a method of evaluating performance of a battery module by using the above-described performance evaluation apparatus according to present invention, the method including:

mounting a battery module, which has a plurality of battery cells in a module case, on a chamber;

generating gas inside the battery module by adjusting an inner temperature of the chamber having the battery module mounted thereon to be in a range of 60 to 100° C.;

measuring gas detection time by sensing gas generated inside the battery module by a plurality of gas sensor units included in the battery module; and predicting a damaged battery cell among the plurality of battery cells by comparing result values obtained by measurement of the respective gas sensor units.

At this time, the generating of the gas is performed at a temperature of 70 to 90° C. for 6 to 12 days.

Further, the plurality of gas sensor units may measure at least one selected from the group consisting of a gas type and a gas concentration value when measuring gas detection time.

Further, the predicting of the damaged battery cell further includes determining whether an electrolyte solution has been leaked by measuring an isolation resistance inside the battery module, and after predicting the damaged battery cell, a step of verifying the prediction result may be performed.

Herein, the verifying step may be performed by determining a damaged battery cell among a plurality of battery cells by disassembling the battery module, and comparing the actually damaged battery cell with the predicted, damaged battery cell in the step of predicting the damaged battery cell.

Advantageous Effects

According to the apparatus and method for evaluating performance of the battery module of the present invention, it is possible equally implement deterioration of battery cells by charging and discharging a battery module under high temperature, harsh conditions at the time of developing a module. Thereby it obtains reliable pressure change measurement results according to a change in the volume of battery cells.

Further, a battery system and an apparatus for evaluating performance of the battery module according to the present invention can accurately predict the location of the battery cell where gas has been generated by introducing a plurality of gas sensor units in the battery module where a plurality of battery cells is accommodated, and comparing gas detection time points measured in the gas sensor units when gas is generated in a battery cell. Hence, the battery system and the apparatus for evaluating performance of the battery module can be usefully used in terms of development of a battery module and/or management of a developed battery module.

DETAILED DESCRIPTION OF THE PREFERRED EMBODIMENTS

Hereinafter, the present invention will be described in detail.

Battery System

The present invention provides a battery system capable of calculating the position of a battery cell where gas is generated by sensing gas, which is generated from a battery cell included in the battery module, in real time.

A battery system according to the present invention includes a battery module, and a battery management system (BMS) configured to control an operation and a state of the battery module. Herein, the battery module includes a plurality of battery cells, a module case for accommodating the battery cells, and a plurality of gas sensor units which are separately positioned on an inner surface of the module case, sense gas generated from the battery cells during charge and discharge, and measure a gas detection time. Herein, the battery management system (BMS) is electrically connected to the gas sensor units to receive information measured from each of the gas sensor units, and compares the received information to thereby calculate a position of a cell where the gas has been generated.

Namely, the battery system can sense gas, which is generated in the currently used battery cell, in real time by introducing a plurality of gas sensor units which are separately positioned in the battery module; and the plurality of gas sensor units may measure the gas-sensed time point and transmit the measured value to the battery management system (BMS), and the battery management system (BMS) can accurately predict the position of the battery cell where gas has been generated by comparing the received gas detection time points.

Hereinafter, each configuration of a battery system according to the present invention will be described in detail.

First, a battery module included in a battery system includes a plurality of battery cells, a module case for accommodating the battery cells, gas sensor units which are separately positioned on the inner surface of the module case, and gas discharge units for discharging gas.

At this time, if the battery cell is a secondary battery capable of charging and discharging, it is not particularly limited. Specifically, the battery cell may be a pouch-type unit cell, and the pouch-type unit cell may have a structure where an electrode assembly of a positive electrode/separator/negative electrode structure is built in a laminate sheet exterior material in a manner that is connected to electrode leads formed outside the exterior material. The electrode leads may be drawn to the outside of the sheet and may be extended in the same or opposite direction to each other.

Figures of the present invention show only a pouch-type battery cell having a form where a pair of electrode leads are withdrawn in the opposite direction for the convenience of explanation, but the battery cell, which is applied to the battery module according to the present invention, is not particularly limited thereto, and a pair of electrode leads may be withdrawn in the same direction.

Further, n or more battery cells (n is an integer equal to or greater than 2) can be accommodated in a module case in a state that is electrically connected. Specifically, the battery cells may be electrically connected by adjusting the number (n) of the battery cells to 2 to 100, 2 to 50, 2 to 40, 10 to 35, 20 to 30, or 5 to 20, depending on the use. The electric connection may be made in series or in parallel or may be made in combination of serial connection and parallel connection.

Further, the module case, where battery cells are accommodated, protects the battery cells to be safely operated under a high temperature and/or humid environment, or an external shock. To this end, the module case may have a structure where moisture cannot be permeated into the module and at the same time, internal heat can be diffused, may be made of a synthetic resin or a metal material with high strength to wrap the battery cells, or may additionally contain a heat dissipation material for emitting heat generated in the battery cells accommodated in the module case.

Further, the module case may include a means for discharging gas which is generated from the battery cell. Specifically, the module case may include a plurality of gas discharge units in order to discharge gas generated from battery cells, and the plurality of gas discharge units may be separately arranged.

As one example, if the module case of the gas discharge unit has a cuboid shape, the gas discharge unit may include a first gas discharge unit located on an arbitrary first side surface among 4 side surfaces, and a second gas discharge unit located on a second side surface facing the first side surface.

As another example, in the case that the module case of the gas discharge unit has a cuboid shape, first to third gas discharge units may be provided on an arbitrary first side surface among 4 side surfaces, a second side surface facing the first side surface, and a third side surface located between the first side surface and the second side surface, respectively.

As further another example, in the case that the module case of the gas discharge unit has a cuboid shape, first to fourth gas discharge units may be sequentially provided on four side surfaces, respectively.

In addition, the gas discharge unit may include an opening formed on the side surface of the module case, and a blowing means for quickly discharging gas generated in a module by being fluidly connected to the opening. The blowing means can decrease the temperature around the battery cell by circulating air around the battery cell by rotating in a forward direction when the temperature inside the battery module is 40° C. or less, and can quickly discharge air around the battery cell by rotating in a reverse direction when the temperature inside the battery module exceeds 40° C.

Further, a gas sensor unit may be individually disposed at a position adjacent to the gas discharge unit. The gas sensor unit senses gas generated in the module case, measures the time point when the gas has been sensed, and calculates the location of the battery cell where the gas has been generated. At this time, it is possible to quickly sense gas generated from battery cells as each of the gas sensor units is disposed at each position adjacent to each of the gas discharge units.

Further, the plurality of gas sensor units may further measure at least one selected from the group consisting of a gas type and a gas concentration value in addition to a gas detection time. The gas type and/or the gas concentration value may be measured by analysis devices such as a gas chromatography (GC), Fourier transform infrared ray spectroscope (FT-IR), a precision gas mass spectrometer (PGMS), and the like. To this end, the gas sensor unit may include the analysis devices at the external side of the module case so that they are fluidly connected to the opening formed on the module case. In general, the weight of the gas may be different depending on the gas type, and the diffusion rate may be different depending on the concentration, thereby affecting the movement speed of the gas. Hence, in the present invention, it is possible to more accurately calculate the location of the battery cell where gas has been generated by additionally measuring the gas type and/or the gas concentration value together with the gas detection time points measured in the gas sensor unit.

In addition, any gas sensor unit may be used without particular limitation as long as it includes a sensor for gas detection, which is used in the related field. Specifically, the gas sensor unit may include a sensor such as a metal oxide sensor, a chemical resistance type sensor, a semiconductor type sensor, a light ion type sensor, or an infrared sensor which are capable of detecting a volatile organic compound (VOC), which contains hydrocarbon gas such as methane, ethane, propane, or butane, carbon dioxide gas, carbon monoxide gas, oxygen gas, etc., in a gas form. As one example, the gas sensor unit may include a semiconductor type sensor that detects a specific gas component contained in the gas and changes the electrical signal according to its concentration.

In addition, the gas sensor unit may be electrically connected to the battery management system (BMS), and transmit the measured values such as gas detection time, gas type and/or gas concentration to the battery management system (BMS). The battery management system (BMS) can calculate the position of the battery cell in which the gas is generated from the information received from the gas sensor unit.

For example, the gas detection time point in a gas sensor unit closest to a battery cell where gas has been generated will be earlier than that in other gas sensor units. Hence, in the case that there are a first gas sensor unit adjacent to a first gas discharge unit located at the first side surface of the module case; and a second gas sensor unit adjacent to a second gas discharge unit located at the second side surface facing the first side surface of the module case, time points, when gas generated in the module is sensed in the first gas sensor unit and the second gas sensor unit, may be measured, and the location of the battery cell where gas has been generated, may be calculated by using the difference between the time points.

Further, the battery management system (BMS) is a device which manages battery cells to be safely used while exhibiting the maximum performance through battery cell capacity management/protection, use history, lifespan prediction, overcharge/overdischarge protection, communication, etc. and may inform its user of a damage to battery cells when a value measured in a gas sensor unit reaches a predetermined value. For example, if the gas concentration measured in the gas sensor unit exceeds 10% of the total volume of the module case, or a specific gas is detected, the battery management system (BMS) informs the user of a warning signal so that the user can temporarily stop the operation of the battery module or replace or repair the battery cell where gas is generated.

Further, the battery system according to the present invention may further includes an isolation resistance sensor unit which is positioned at an inner surface of the module case, measures an isolation resistance of the battery module, and transmits a measurement value to the battery management system (BMS). When a battery cell is used for a long time, a swelling of the battery cell is caused, and the battery cell is damaged, which may cause the leakage of the electrolyte solution. In this case, since the leaked electrolyte solution decreases the isolation resistance in the battery module, it is possible to determine whether there been an electrolyte solution leakage generated due to the swelling of a battery cell by measuring the isolation resistance of the inner surface of the module case, more specifically a portion contacting the electrode lead of the battery cell accommodated in the module case (e.g., a frame of a bus bar, etc.); and a substrate for preventing a lower short circuit provided in the lower end and the inner bottom surface of the module case contacting the lower end of the battery cell (e.g., an insulating rubber, an insulating film, etc.). As such, it is possible to more accurately predict the time point of damage to the battery cell (gas venting time point). Meanwhile, the battery system according to the present invention may be a battery pack or an energy storage system (ESS) used for a vehicle or the like.

Specifically, the battery system can be used for an electric vehicle, a hybrid electric vehicle, a plug-in hybrid electric vehicle or a battery pack for a vehicle such as a power storage device, and the battery system used as the power source of a vehicle can be combined in various ways according to the desired output and capacity.

In addition, the battery system may be used as an energy storage system (ESS) that stores electricity produced by utilizing renewable energy such as sunlight, wind power, and tidal power.

The battery system according to the present invention can sense gas generated in the battery module in real time and quickly and accurately determine the battery cell where gas is generated, significantly reduce the failure and accident risk of the battery system, and improve the operation efficiency of the battery system, by having the above-described configuration.

Apparatus for Evaluating Performance of Battery Module

In addition, the present invention provides an apparatus for evaluating performance of a battery module, which has been used for a long time, by exposing the battery module under harsh conditions, in an embodiment of the present invention.

The apparatus for evaluating performance of the battery module according to the present invention can induce a swelling by deterioration of battery cells accommodated in a battery module within a short period of time by fixing the battery module under development or before use in a chamber and storing the battery module under harsh conditions by maintaining the temperature in the chamber at a high temperature. As such, battery cells are damaged, and gas is generated in the battery module due to the damage of the battery cells. The generated gas is sensed by a plurality of gas sensor units included in the battery module, and the gas detection signal is transmitted to the data processing unit. The data processing unit derives time points when gas has been sensed in respective gas sensor units by comparing gas detection signals transmitted from a plurality of gas sensor units, and the locations of the damaged battery cells can be predicted by comparing derived time points. In some cases, it is possible to additionally predict time points when the battery cells have been damaged.

To this end, the apparatus for evaluating performance of the battery module includes: a chamber; a temperature controller which is positioned inside the chamber and controls an average temperature of an inside of the chamber to be in a range of 60 to 100° C.; a battery module including a module case, which is mounted inside the chamber and accommodates a plurality of battery cells, and a plurality of gas sensor units which are separately positioned on an inner surface of the module case, sense gas generated inside the module case, and measure a gas detection time; and a data processing unit which is electrically connected to the plurality of gas sensor units, receives gas detection time measured by each of the gas sensor units, and compares the received gas detection time, to thereby predict a damaged battery cell among the plurality of battery cells.

At this time, the chamber provides a space for storing the battery module during the performance evaluation of the battery module. The chamber may be composed of a dual structure, specifically, a first housing, and a second housing surrounding the first housing. In addition, the battery module may be stored in the first housing. In particular, the first housing is a space that provides a place to implement the high temperature characteristics of the battery module, and the inner surface of the first housing may be treated to include some of thermally conductive materials, or the surface may be coated. For example, the interior of the first housing may contain metal materials such as SUS, copper, and aluminum. Further, it is preferable that the second housing located on the outside of the first housing is made of an insulating material such as Teflon or the like. Hereinafter, the first housing is referred to as "chamber" for convenience of explanation.

In addition, an explosion-proof door or the like may be installed at the first housing for storing the battery module. In a specific example, the first housing may include an explosion-proof door for the purpose of blocking the storm pressure and heat generated from various weapons, and simultaneously blocking damage due to debris.

Further, the temperature controller is located in the chamber to perform the function of controlling the inner temperature of the chamber to 60° C. to 100° C. For this purpose, the temperature controller may include a heating member, and the heating member may be an electrothermal assembly composed of heaters which are supplied power from a battery module, or a plurality of heating wires that are supplied power and are heated. The electrothermal assembly may have a structure where heating wires are arranged in a lattice structure. The lattice structure allows the high flow rate air from the blower to be easily moved through the lattice and does not generate a large resistance to a fluid flowing via the electrothermal assembly. In addition, in the lattice structure, a plurality of heating wires are separately arranged. As such, the inside of the pack case can be more quickly heated in the lattice structure than in the structure where heating wires are concentrated.

In addition, the temperature controller can control the average temperature in the chamber in the range of 60 to 100° C., specifically in the range of 60 to 90° C., 60 to 80° C., 70 to 90° C., or 80 to 90° C. In the present invention, by adjusting the temperature range inside the chamber controlled by the temperature controller, deterioration of a battery module under development or before use under harsh conditions can be induced for a short period of time, and such an induced deterioration of the battery module is induced in a manner that is similar to deterioration of a battery module which has been used for several years. As such, high reliability information on phenomenon generated by deterioration of a battery module, such as gas generation, swelling generation of a battery cell (e.g., pressure change amount according to volume change of a battery cell, etc.) can be obtained.

First, the battery module stored in the chamber includes a plurality of battery cells, a module case for accommodating the battery cells, gas sensor units which are separately positioned on the inner surface of the module case, and gas discharge units for discharging gas.

At this time, if the battery cell is a secondary battery capable of charging and discharging, it is not particularly limited. Specifically, the battery cell may be a pouch-type unit cell, and the pouch-type unit cell may have a structure where an electrode assembly of a positive electrode/separator/negative electrode structure is built in a laminate sheet exterior material in a manner that is connected to electrode leads formed outside the exterior material. The electrode leads may be drawn to the outside of the sheet and may be extended in the same or opposite direction to each other.

Figures of the present invention show only a pouch-type battery cell having a form where a pair of electrode leads are withdrawn in the opposite direction for the convenience of explanation, but the battery cell, which is applied to the battery module according to the present invention, is not particularly limited thereto, and a pair of electrode leads may be withdrawn in the same direction.

Further, n or more battery cells (n is an integer equal to or greater than 2) can be accommodated in a module case in a state that is electrically connected. Specifically, the battery cells may be electrically connected by adjusting the number (n) of the battery cells to 2 to 100, 2 to 50, 2 to 40, 10 to 35, 20 to 30, or 5 to 20, depending on the use. The electric connection may be made in series or in parallel or may be made in combination of serial connection and parallel connection.

Further, the module case, where battery cells are accommodated, protects the battery cells to be safely operated under a high temperature and/or humid environment, or an external shock. To this end, the module case may have a structure where moisture cannot be permeated into the module and at the same time, internal heat can be diffused, may be made of a synthetic resin or a metal material with high strength to wrap the battery cells, or may additionally contain a heat dissipation material for emitting heat generated in the battery cells accommodated in the module case.

Further, the module case may include a means for discharging gas which is generated from the battery cell. Specifically, the module case may include a plurality of gas discharge units on the side surface and the upper surface in order to discharge gas generated from battery cells, and the plurality of gas discharge units may be separately arranged.

As one example, if the module case of the gas discharge unit has a cuboid shape, the gas discharge unit may include a first gas discharge unit located on an arbitrary first side surface among 4 side surfaces, and a second gas discharge unit located on a second side surface facing the first side surface.

As another example, in the case that the module case of the gas discharge unit has a cuboid shape, first to third gas discharge units may be provided on an arbitrary first side surface among 4 side surfaces, a second side surface facing the first side surface, and a third side surface located between the first side surface and the second side surface, respectively. As further another example, in the case that the module case of the gas discharge unit has a cuboid shape, first to fourth gas discharge units may be sequentially provided on four side surfaces, respectively.

In addition, the gas discharge unit may include an opening formed on the side surface of the module case, and a blowing means for quickly discharging gas generated in a module by being fluidly connected to the opening. The blowing means can decrease the temperature around the battery cell by circulating air around the battery cell by rotating in a forward direction when the temperature inside the battery module is 40° C. or less, and can quickly discharge air around the battery cell by rotating in a reverse direction when the temperature inside the battery module exceeds 40° C.

Further, a gas sensor unit may be individually disposed at a position adjacent to the gas discharge unit. The gas sensor unit senses gas generated in the module case, measures the time point when the gas has been sensed, and calculates the location of the battery cell where the gas has been generated. At this time, it is possible to quickly sense gas generated from battery cells as each of the gas sensor units is disposed at each position adjacent to each of the gas discharge units.

As one example, the battery module, which is stored in the apparatus for evaluating performance of the battery module, may have a first gas discharge unit and a second gas discharge unit at the side surface of the module case, and a first gas sensor unit and a second gas sensor unit may be arranged at the first gas discharge unit and the second gas discharge unit, respectively. At this time, the first gas discharge unit is formed at one side surface of the battery module, and the second gas discharge unit is formed at the other side surface of the battery module. As such, the first gas sensor unit is arranged on one side surface of the battery module, and the second gas sensor unit is arranged on the other side surface of the battery module.

Namely, the first gas sensor unit may be arranged on the front side of the battery module, and the second gas sensor unit may be arranged on the rear side which is a region opposite to the region where the first gas sensor unit is arranged. For example, when one battery cell is damaged in the battery module, gas generated in the battery module is discharged to the first and second gas discharge units. Further, the generated gas may be sensed by the first and second gas sensor units respectively arranged at the first and second gas discharge units.

Further, the plurality of gas sensor units may further measure at least one selected from the group consisting of a gas type and a gas concentration value in addition to a gas detection time. The gas type and/or the gas concentration value may be measured by analysis devices such as a gas chromatography (GC), Fourier transform infrared ray spectroscope (FT-IR), a precision gas mass spectrometer (PGMS), and the like. To this end, the gas sensor unit may include the analysis devices at the external side of the module case so that they are fluidly connected to the opening formed on the module case. In general, the weight of the gas may be different depending on the gas type, and the diffusion rate may be different depending on the concentration, thereby affecting the movement speed of the gas. Hence, in the present invention, it is possible to more accurately calculate the location of the battery cell where gas has been generated by additionally measuring the gas type and/or the gas concentration value together with the gas detection time points measured in the gas sensor unit. In addition, any gas sensor unit may be used without particular limitation as long as it includes a sensor for gas detection, which is used in the related field. Specifically, the gas sensor unit may include a sensor such as a metal oxide sensor, a chemical resistance type sensor, a semiconductor type sensor, a light ion type sensor, or an infrared sensor which are capable of detecting a volatile organic compound (VOC), which contains hydrocarbon gas such as methane, ethane, propane, or butane, carbon dioxide gas, carbon monoxide gas, oxygen gas, etc., in a gas form. As one example, the gas sensor unit may include a semiconductor type sensor that detects a specific gas component contained in the gas and changes the electrical signal according to its concentration.

In addition, as described above, the data processing unit predicts the location of the damaged battery cell among a plurality of battery cells accommodated in the module case by comparing gas detection time points sensed by a plurality of gas sensor units. Specifically, a plurality of gas sensor units, or the first gas sensor unit and the second gas sensor unit sense gas generated in the battery module and transmit a gas detection signal to a data processing unit. Thereafter, the data processing unit may compare gas detection times sensed in the first gas sensor unit and the second gas sensor unit to thereby predict a damaged battery cell among a plurality of battery cells.

Namely, the data processing unit may compare gas detection times at the first gas sensor unit and the second gas sensor unit, and predict a time point and/or a location in which a battery cell has been damaged. For example, when the gas detection time of the first gas sensor unit is similar to that of the second gas sensor unit, it means that the difference between a time point when the generated gas is moved to the first gas sensor unit and a time when the generated gas is moved to the second gas sensor unit is small. Hence, it can be determined that the damaged battery cell is located in the central region in the battery module, which corresponds to the central region of the first and second gas sensor units. Further, if the gas detection time in the second gas sensor unit is faster than the gas detection time in the first gas sensor unit, it may be determined that the damaged battery cell is located in a region adjacent to the second gas sensor unit.

In one embodiment, the apparatus for evaluating performance of the battery module according to the present invention further includes an output unit for outputting the gas concentration, which is sensed in the gas sensor unit, as the resistance value over time. In particular, the data processing unit can predict the damaged battery cell based on the gas detection time and the peak value outputted from the output unit. On the other hand, the output unit may be a conventional monitoring device or output device.

In addition, the performance evaluation apparatus of the battery module according to the present invention further includes a storage unit for storing the results of the data processing unit. Specifically, the storage unit receives results from the data processing unit and stores the results.

It is possible for a user to operate the data processing unit and the storage unit directly, but the data processing unit and the storage unit may also be operated by an automated system.

As one example, a charge/discharge unit, which is electrically connected to the battery cells accommodated in the battery module, may be further included. The charge/discharge unit may supply power for charge to the secondary battery or receive discharge power from the secondary battery. Herein, supplying power to the secondary battery is not limited to supplying power which is sufficient for fully charging the secondary battery. Supplying power to the secondary battery may also mean supplying power which may be sufficient for measuring voltages of the first electrode lead and the second electrode lead to evaluate performance of the secondary battery. The same may be applied to the meaning of receiving discharge power from the secondary battery, and thus repeated description thereof is omitted here.

Further, the apparatus for evaluating performance of a battery module according to the present invention further includes a temperature sensor unit for sensing the temperature of the battery module and the inside of the chamber. The temperature sensor unit is used to detect the ambient temperature of the battery module and the inside of the chamber when a battery cell inside the battery module is damaged. The temperature sensor unit is not show in the drawings, but one or more temperature sensor units may be provided, and temperatures at several parts of the battery module may be sensed.

Further, the apparatus for evaluating performance of the battery module according to the present invention may further include an isolation resistance sensor unit, which measures the isolation resistance of the inside of the battery module and transmits the measured isolation resistance values to the electrically connected data processing unit. Further, the isolation resistance sensor unit may further include an insulation monitoring device for measuring the isolation resistance inside the battery module. When battery cell damage occurs during the evaluation of swelling characteristics of the battery cell, the isolation resistance is reduced due to the leakage of the electrolyte solution in the battery cell. At this time, the insulation monitoring device can monitor the isolation resistance of the battery module to determine whether the electrolyte solution has been leaked, and thus can guess the damaged time point (e.g., venting time point) of the battery cell.

According to the apparatus for evaluating performance of the battery module of the present invention, it is possible equally implement deterioration of battery cells by charging and discharging a battery module under high temperature, harsh conditions at the time of developing a module. As such, it is possible to obtain reliable pressure change measurement results according to a change in the volume of battery cells. Further, the apparatus for evaluating performance of the battery module can accurately predict the location of the battery cell where gas has been generated by introducing a plurality of gas sensor units in the battery module where a plurality of battery cells are accommodated, and comparing gas detection time points measured in the gas sensor units when gas is generated in a battery cell. Hence, the apparatus for evaluating performance of the battery module can be usefully used at the time of development of a battery module.

Method of Evaluating Performance of Battery Module

Further, the present invention provides a method of evaluating performance of a battery module using the above-described apparatus for evaluating performance of the battery module according to the present invention, in an embodiment.

According to the method of evaluating performance of the battery module of the present invention, it is possible to accurately and reliably evaluate performance of the battery module within a short time by using the apparatus for evaluating performance of the battery module of the present invention.

At this time, the performance evaluation method includes: installing a battery module under development or before use in a chamber; generating gas inside the battery module by adjusting an inner temperature of the chamber having the battery module mounted thereon to be in a range of 60 to 100° C.; measuring gas detection time by sensing gas generated inside the battery module by a plurality of gas sensor units included in the battery module; and predicting a damaged battery cell among the plurality of battery cells by comparing result values obtained by measurement of the respective gas sensor units.

Namely, the method of evaluating performance implements a swelling of a battery cell by storing the battery module under high temperature, harsh conditions for a short period of time (e.g., 30 days or less). As such, the battery cell is damaged by the swelling of the battery cell accommodated in the battery module, and gas is leaked by the damage of the battery cell in the battery module. At this time, a plurality of gas sensor units formed in the battery module sense gas generated in the battery module and transmit a gas detection signal to a data processing unit. The data processing unit predicts the damaged battery cell among a plurality of battery cells by comparing gas detection time points sensed by the plurality of gas sensor units, and predicts the damage time point when the battery cell has been damaged by comparing the gas detection time points.

Herein, in the step of generating gas in the battery module, it is possible to control the average temperature in the chamber in the range of 60 to 100° C., specifically in the range of 60 to 90° C., 60 to 80° C., 70 to 90° C., or 80 to 90° C.

Further, the step of generating gas in the battery module may be performed for less than 30 days, specifically for 1 to 25 days; for 1 to 20 days; for 5 to 20 days; for 5 to 15 days; or for 6 to 12 days.

In the present invention, by adjusting the temperature range inside the chamber and performance period in the step of generating gas inside a battery module, deterioration of a battery module under development or before use under harsh conditions can be induced for a short period of time, and such an induced deterioration of the battery module is induced in a manner that is similar to deterioration of a battery module which has been used for several years. As such, high reliability information on phenomenon generated by deterioration of a battery module, such as gas generation, swelling generation of a battery cell (e.g., pressure change amount according to volume change of a battery cell, etc.) can be obtained.

Further, the step of measuring the gas detection time is a step where a plurality of gas sensor units sense gas generated from battery cells and measure the sensed time. At this time, the plurality of gas sensor units may further measure at least one selected from the group consisting of a gas type and a gas concentration value in addition to a gas detection time. The gas type and/or the gas concentration value may be measured by analysis devices such as a gas chromatography (GC), Fourier transform infrared ray spectroscope (FT-IR), a precision gas mass spectrometer (PGMS), and the like. To this end, the gas sensor unit may include the analysis devices at the external side of the module case so that they are fluidly connected to the opening formed on the module case. In general, the weight of the gas may be different depending on the gas type, and the diffusion rate may be different depending on the concentration, thereby affecting the movement speed of the gas. Hence, in the present invention, it is possible to more accurately calculate the location of the battery cell where gas has been generated by additionally measuring the gas type and/or the gas concentration value together with the gas detection time points measured in the gas sensor unit.

Further, the battery module mounted inside the chamber may have a structure in which a plurality of gas discharge units are formed. As one example, the battery module has a structure where a first gas discharge unit and a second gas discharge unit are formed on one side surface and the other side surface, respectively, and first and second gas sensor units are disposed at the first gas discharge unit and the second gas discharge unit, respectively. As such, gas detection times, which are sensed from the first gas sensor unit and the second gas sensor unit, can be compared in the process of predicting the damaged battery cell. The process of predicting the damaged battery cell has already been described above, and thus a detailed description thereof is omitted here.

Further, the step of storing the battery module may further include a process of outputting gas concentration, which has been sensed in the gas sensor unit, as a resistance value over time. In a specific example, it is possible to predict the damaged battery cell based on the gas detection time and the peak value outputted from the output unit. In addition, the evaluation method of the battery module according to the present invention further includes the process of storing the results of the data processing unit.

Further, the performance evaluation method of the battery module according to the present invention may further include a charge/discharge process for driving the charge/discharge of the battery cell stored in the battery module. Specifically, the charge/discharge process includes supplying power for charge to the secondary battery or receiving discharge power from the secondary battery. At this time, supplying power to the secondary battery is not limited to supplying power which is sufficient for fully charging the secondary battery.

Further, the step of generating gas inside the battery module may further include a process of sensing the temperature of the battery module and the inside of the chamber. This is to sense the temperature inside the chamber and the temperature around the battery module at the time of damage to a battery cell in the step at which gas is generated inside the battery module, and reduce the deviation. Though not shown in the drawings, a plurality of temperature sensor units may be provided and may sense temperatures at several portions.

Further, the predicting of the damaged battery cell may further include determining whether an electrolyte solution has been leaked by measuring an isolation resistance inside the battery module. When battery cell damage occurs, the isolation resistance is reduced due to the leakage of the electrolyte solution in the battery cell. Namely, it is possible to determine whether an electrolyte solution has been leaked in the battery module through the process of monitoring the insulation characteristics of the battery module. As such, it is also possible to guess the damaged time point (e.g., a venting time point).

In a specific example, the process of monitoring the isolation resistance of the battery module can be performed simultaneously with the process of predicting the damaged battery cell among the plurality of battery cells. In the step of storing the battery module, the damaged battery cell can be predicted among the plurality of battery cells by monitoring gas generation. At the same time, the point of time when the battery cell has been damaged can be predicted by monitoring the isolation resistance.

Further, the method of evaluating performance of the battery module according to the present invention may further include the step of verifying the prediction result after predicting the damaged battery cell. The verifying step may be performed by determining the damaged battery cell among a plurality of battery cells by disassembling the battery module, and comparing the actually damaged battery cell with the predicted, damaged battery cell in the step of predicting the damaged battery cell.

According to the apparatus for evaluating performance of the battery module according to the present invention and the method of evaluating the battery module of the present invention, it is possible to easily predict damaged battery cells among n battery cells by comparing gas detection time points sensed by the plurality of gas sensor units and comparing peak values. In addition, it is understood that it would be possible to easily determine whether a battery cell has been damaged and guess the time point when the battery cell has been damaged, by monitoring the battery module in real time using the insulation monitoring device.

DETAILED DESCRIPTION OF THE PREFERRED EMBODIMENTS

Hereinafter, various types of the performance evaluation apparatus and the performance evaluation method of the battery module according to the present invention will be described with reference to the drawings.

First Embodiment

Figure 2:
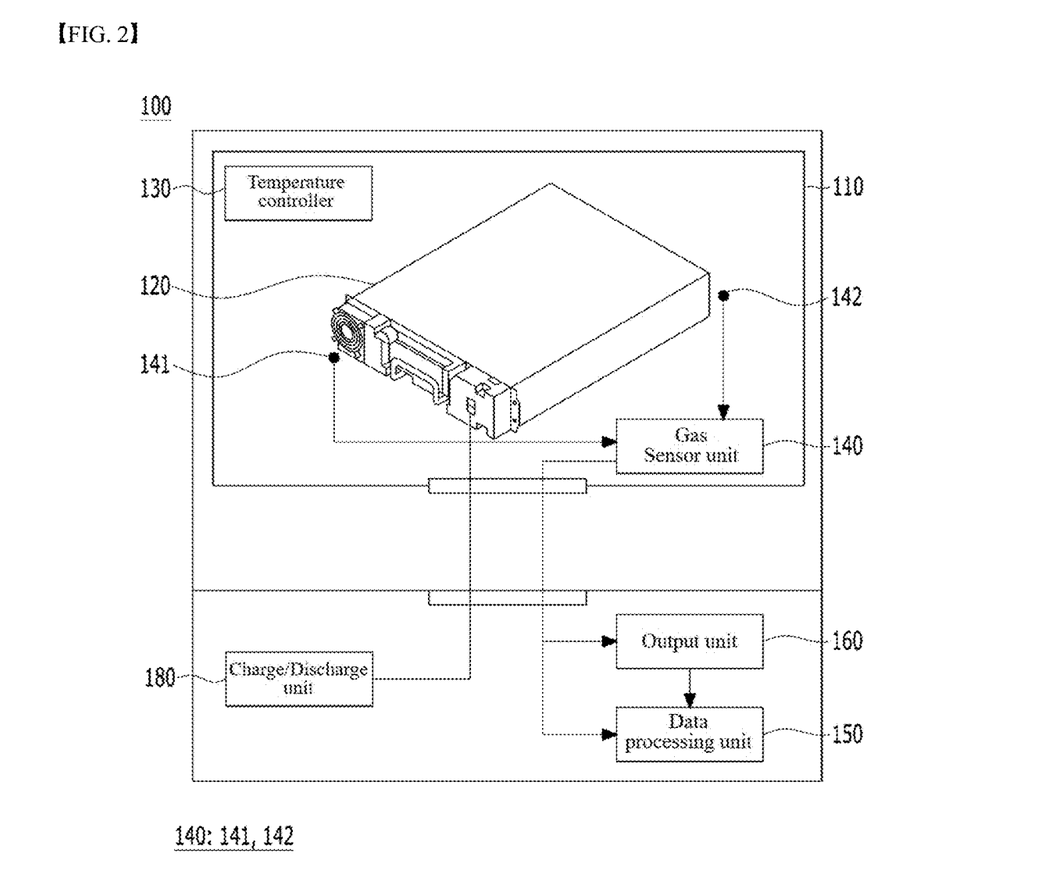
FIG. 2 is a diagram showing a configuration of a performance evaluation apparatus of a battery module according to an embodiment of the present invention.

FIG. 2 is a diagram showing a configuration of a performance evaluation apparatus of a battery module according to an embodiment of the present invention.

Referring to FIG. 2, an apparatus 100 for evaluating performance of a battery module according to the present invention includes: a chamber 110; a battery module 120 which is stored in the chamber 110, includes a plurality of gas discharge units (not shown), and accommodates n (n is an integer equal to or greater than 2) battery cells; a temperature controller which controls an average temperature of an inside of the chamber to be in a range of 60 to 100° C.; gas sensor units which are positioned inside the chamber 110 and sense gas leaked from the inside of the battery module 120; and a data processing unit 150 which predicts a damaged battery cell among the n battery cells by comparing gas detection times sensed by respective gas sensor units 140.

Specifically, the apparatus 100 for evaluating performance of the battery module according to the present invention implements a swelling of the battery cell by storing the battery module 120 in a high temperature chamber 110. As such, the battery cell accommodated in the battery module 120 is caused to be damaged (vented) by the swelling, and gas is generated by the damage of the battery cell in the battery module 120. At this time, the gas sensor units 140, which are respectively disposed at the plurality of gas discharge units formed on the battery module 120, sense gas generated inside the battery module 120 and transmit the gas detection signal to the data processing unit 150. Further, the data processing unit 150 can predict the damaged battery cell among n battery cells by comparing gas detection time points sensed in the plurality of gas sensor units 140 and comparing the result values obtained by measurement of respective gas sensor units 140. Further, the data processing unit 150 can predict the damaged time point of the battery cell by comparing the gas detection time points in the plurality of the gas sensor units 140.

The battery module 120 of the apparatus for evaluating performance of the battery module according to the present invention has a structure where two gas discharge units are formed. Specifically, the battery module 120 has a structure where a first gas discharge unit and a second gas discharge unit are formed, and a first gas sensor unit 141 and a second gas sensor unit 142 are arranged at the first gas discharge unit and the second gas discharge unit, respectively. At this time, the first gas discharge unit is formed at one side surface of the battery module 120, and the second gas discharge unit is formed at the other side surface of the battery module 120. As such, the first gas sensor unit 141 is arranged on one side surface of the battery module 120, and the second gas sensor unit 142 is arranged on the other side surface of the battery module 120.

Namely, the first gas sensor unit 141 is arranged at the front side of the battery module 120, and the second gas sensor unit 142 is arranged at the rear side corresponding to a region opposite to a region where the first gas sensor unit 141 is arranged. The gas sensor unit 140 is a device that detects a specific gas component contained in the gas by a gas sensor and changes the electrical signal according to its concentration.

For example, when one battery cell is damaged in the battery module 120, gas generated in the battery module 120 is discharged to the first and second gas discharge units. Further, the generated gas is sensed in the first gas sensor unit 141 and the second gas sensor unit 142 which are arranged at the first gas discharge unit and the second gas discharge unit, respectively. If the gas detection time points in the first gas sensor unit 141 and the second gas sensor unit 142 are similar, it means that the time it took for the generated gas to get to the first gas sensor unit 141 is similar to the time it took for the gas to get to the second gas sensor unit 142. Hence, it can be determined that the damaged battery cell is disposed in the central region in the battery module 120.

Further, when there was a damage in one battery cell in the battery module 120, if the gas detection time point at the second gas sensor unit 142 was earlier than the gas detection time point at the first gas sensor unit 141, and the result value obtained by measurement of the second gas sensor unit 142 was greater than that of the first gas sensor unit 141, it can be determined that the damaged battery cell is arranged in a region adjacent to the second gas sensor unit 142.

Meanwhile, the apparatus 100 for evaluating performance of the battery module according to the present invention further includes an output unit 160 for outputting the gas concentration, which is sensed in the gas sensor unit 140, as the resistance value over time. In particular, the data processing unit 150 can predict the damaged battery cell based on the gas detection time and the peak value outputted from the output unit 160.

Further, the apparatus 100 for evaluating performance of the battery module according to the present invention may be electrically connected to the battery module 120 and further include a charge/discharge unit 180 for driving charge/discharge of the battery cells stored in the battery module. The charge/discharge unit 180 may be electrically connected to the battery module and supply power for charge to battery cells in the battery module 120 or receive discharge power from battery cells. Herein, supplying power to the battery cells is not limited to supplying power which is sufficient for fully charging the battery cells. The same may be applied to the meaning of receiving discharge power from the battery cells, and thus repeated description thereof is omitted here. On the other hand, in the present invention, a swelling at high temperatures can be implemented by storing the battery module 120 at a high temperature and performing charge/discharge.

Further, the apparatus 100 for evaluating performance of the battery module according to the present invention may further include a temperature sensor unit (not shown) for sensing the temperature of the battery module 120 and the inside of the chamber 110. The temperature sensor unit is used to detect the ambient temperature of the battery module 120 and the inside of the chamber 110 when a battery cell inside the battery module 120 is damaged. The temperature sensor unit is not show in the drawings, but one or more temperature sensor units may be provided, and temperatures at several parts of the battery module 120 may be sensed.

In one embodiment, evaluation of the battery module was performed using the apparatus for evaluating performance of the battery module.

More specifically, a battery module, which accommodates 14 battery cells, was stored in the chamber of the apparatus for evaluating performance of the battery module for 10 days. At this time, the charge/discharge for the battery cells stored in the battery module were performed, and the average temperature in the chamber was maintained at 80° C. In the step of storing the battery module, gas generated in the battery module was sensed in the first gas sensor unit and the second gas sensor unit, and the result was shown in FIG. 4.

Figure 3:
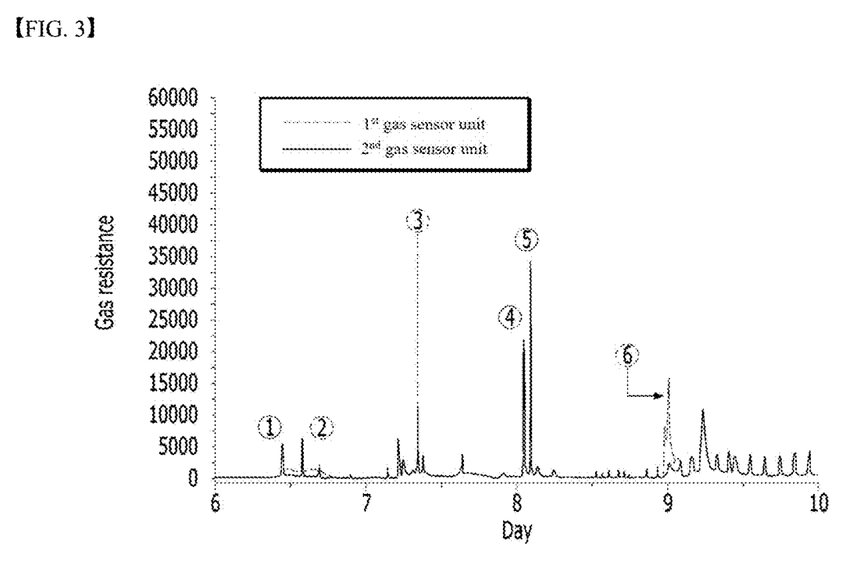
FIG. 3 is a graph showing evaluation results of an apparatus for evaluating performance of a battery module according to an embodiment of the present invention.

FIG. 3 is a graph showing the result of a gas chromatography (GC) included in an apparatus for evaluating performance of the battery module according to the present invention and shows the concentration of gas generated over time as the peak intensity.

A process of determining the damaged battery cell among battery cells accommodated in the battery module in the step of storing the battery module in a high temperature will be described with reference to FIG. 3.

First, referring to the peak no. 1 and the peak no. 2 among 6 peaks, it is seen that the gas detection time point of the first gas sensor unit was similar to the gas detection time point of the second gas sensor unit, and the peak values in the first gas sensor unit and the second gas sensor unit were also similar. This means that the distance between the damaged battery cell and the first gas sensor unit is similar to the distance between the damaged battery cell and the second gas sensor unit. Namely, it can be predicted that a battery cell, which is arranged in the central region of the battery module, has been damaged, through peak values of peaks no. 1 and no. 2.

Further, referring to peaks no. 3 and no 4, the peak value of the peak no. 3 was sensed earlier than the peak value in the peak no. 4, and the peak value of the peak no. 3 was higher than the peak value of the peak no. 4. This means that the damaged battery cell in the battery module is located in a position which is more adjacent to the first gas sensor unit than the second gas sensor unit. Specifically, it means that since the damaged battery cell is located in a position adjacent to the first gas sensor unit, the gas could be sensed first in the first gas sensor unit.

Further, referring to peaks no. 5 and no 6, the peak value of the peak no. 5 was sensed earlier than the peak value in the peak no. 6, and the peak value of the peak no. 5 was higher than the peak value of the peak no. 6. This means that the damaged battery cell in the battery module is located in a position which is more adjacent to the second gas sensor unit than the first gas sensor unit.

Figure 4:
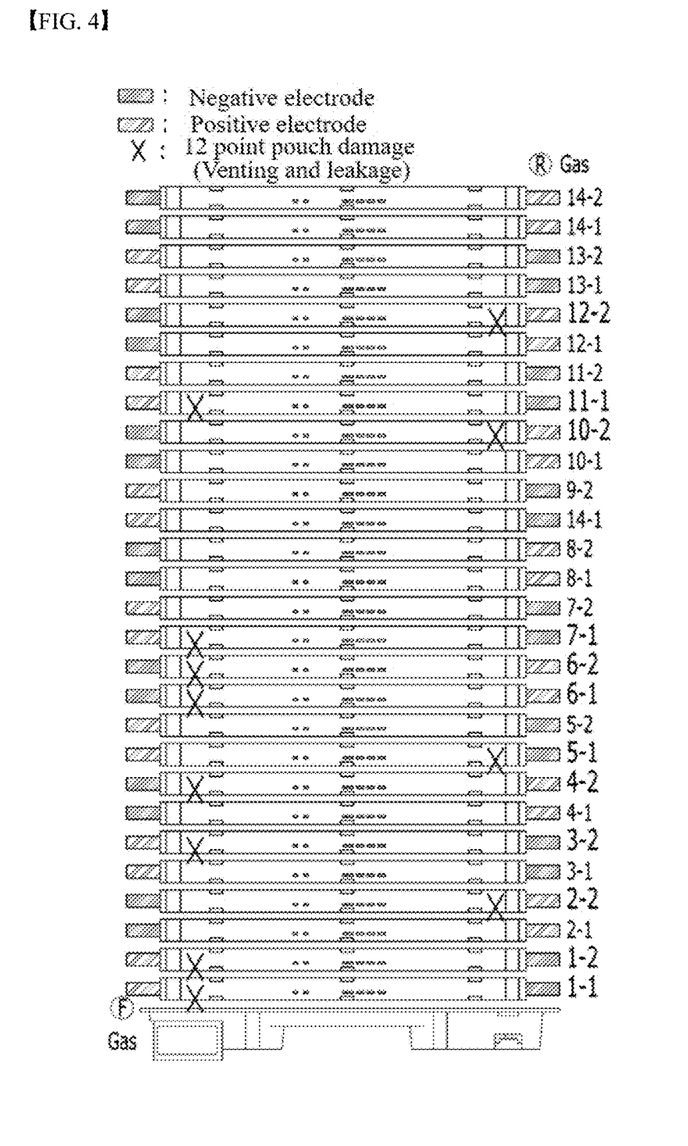
FIG. 4 is a diagram showing the evaluation result of an apparatus for evaluating performance of the battery module according to an embodiment of the present invention and shows positions of damaged battery cells in a battery module.

Further, as an embodiment according to the present invention, in order to verify the result predicted through the apparatus for evaluating performance of the battery module, a battery module stored in a chamber was disassembled, and the damaged battery cells were checked, and the result is shown in FIG. 4.

FIG. 4 is a diagram showing the evaluation result of an apparatus for evaluating performance of the battery module according to an embodiment of the present invention and shows positions of damaged battery cells in a battery module.

Referring to FIG. 4, 3 battery cells were damaged among 14 battery cells. When compared with FIG. 3, peak no. 1 and peak no. 2 are due to the damage of battery cell 7-1, and peak no. 3 and peak no. 4 are due to the damage of the battery cell 4-2. Further, it is seen that peak no. 5 and peak no. 6 are due to the damage of the battery cell 10-2.

According to the apparatus for evaluating performance of the battery module according to the present invention and the method of evaluating the battery module of the present invention, it is possible to easily predict the damaged battery cells among a plurality battery cells by comparing gas detection time points sensed by the plurality of gas sensor units.

Second Embodiment

Figure 5:
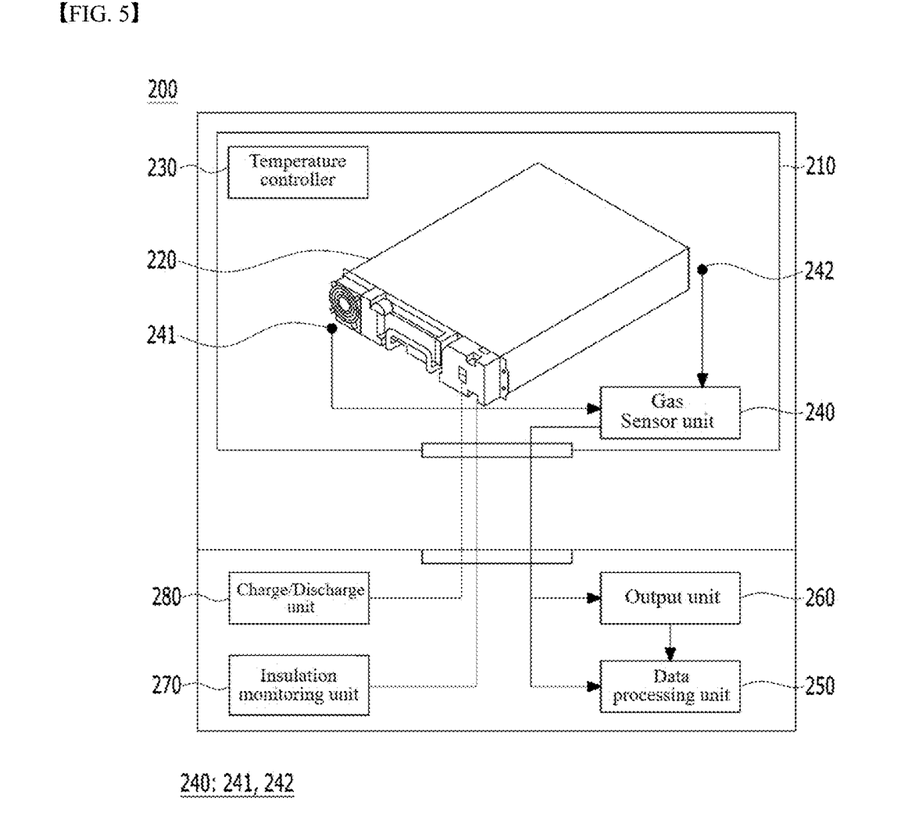
FIG. 5 is a diagram showing a configuration of a performance evaluation apparatus of a battery module according to another embodiment of the present invention.

FIG. 5 is a diagram showing a configuration of a performance evaluation apparatus of a battery module according to another embodiment of the present invention.

Referring to FIG. 5, an apparatus 200 for evaluating performance of a battery module according to the present invention includes: a chamber 210; a battery module 220 which is stored in the chamber 210, includes a plurality of gas discharge units (not shown), and accommodates n (n is an integer equal to or greater than 2) battery cells; a temperature controller which controls an average temperature of an inside of the chamber to be in a range of 60 to 100° C.; gas sensor units which are respectively arranged at a plurality of gas discharge units and sense gas generated from the inside of the battery module 220; and a data processing unit 250 which predicts a damaged battery cell among the n battery cells by comparing gas detection time points sensed by respective gas sensor units 240 and comparing peak values.

The battery module 220 of the apparatus 200 for evaluating performance of the battery module according to the present invention has a structure where two gas discharge units are formed. Specifically, the battery module 220 has a structure where first and second gas discharge units are formed, and first and second gas sensor units 241 and 242 are arranged at the first and second gas discharge units, respectively. At this time, the first gas discharge unit is formed at one side surface of the battery module 220, and the second gas discharge unit is formed at the other side surface of the battery module 220. As such, the first gas sensor unit 241 is arranged on one side surface of the battery module 220, and the second gas sensor unit 242 is arranged on the other side surface of the battery module 220.

Further, the apparatus 200 for evaluating performance of the battery module according to the present invention includes an insulation monitoring device 270. Specifically, the insulation monitoring device 270 is used to monitor the insulation properties of the battery module 220.

When battery cell damage occurs during the evaluation process of the battery module, the isolation resistance is reduced due to the leakage of the electrolyte solution in the battery cell. That is, the insulation monitoring device 270 can monitor the isolation resistance of the battery module 220 to determine whether the electrolyte solution has been leaked, and thus can guess the damaged (venting) time point of the battery cell.

Further, since the data processing unit 250, the output unit 260 and the charge/discharge unit 280 of the apparatus 200 for evaluating performance of the battery module according to the present invention have already been described above, the detailed description thereof is omitted here.

Further, in one embodiment according to the present invention, evaluation of the battery module was performed using the apparatus for evaluating performance of the battery module. More specifically, a battery module, which accommodates 14 battery cells, was stored in the chamber of the apparatus for evaluating performance of the battery module for 10 days. At this time, the battery cells inside the battery module maintained the average temperature of the inside of the chamber at 80° C. while performing charge/discharge, and the isolation resistance of the battery module was monitored. The results are shown in FIG. 6.

Figure 6:
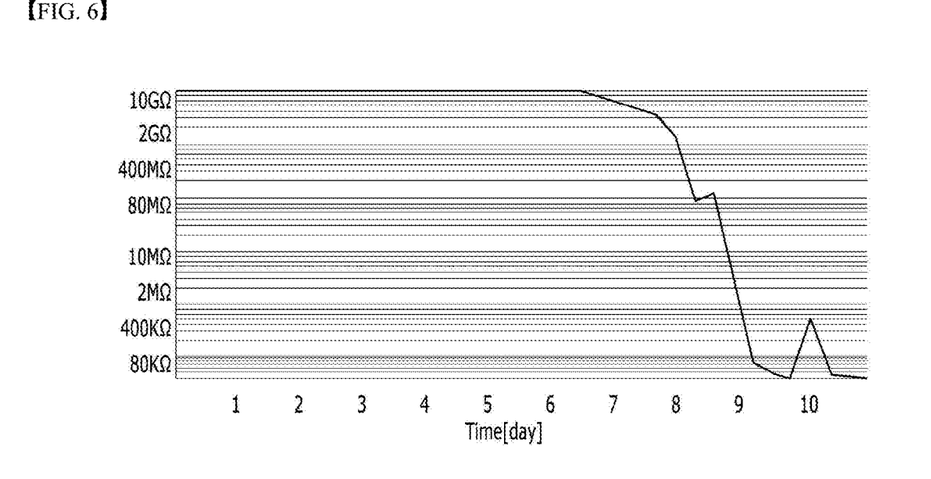
FIG. 6 is a graph showing isolation performance of a battery module, which are obtained by measurement in the evaluation process of the battery module according to another embodiment of the present invention.

FIG. 6 is a graph showing isolation resistances of a battery module, which are obtained by measurement in the evaluation process of the battery module according to another embodiment of the present invention. Referring to FIG. 6, it is seen that the isolation resistance of the battery module decreases from the time point after 6 days from the storage of the battery module. This seems to be due to the leakage of the electrolyte solution by the damage of the battery cells housed in the battery module.

On the other hand, the description about each process of a method of evaluating a battery module according to the present invention has already been made above, and thus a specific description about each process is omitted here.

According to the apparatus for evaluating performance of the battery module according to the present invention and the method of evaluating the battery module of the present invention, it is possible to easily predict damaged battery cells among n battery cells by comparing gas detection time points sensed by the plurality of gas sensor units and comparing values measured by the gas sensor units. In addition, it is understood that it would be possible to easily determine whether a battery cell has been damaged and guess the time point when the battery cell has been damaged, by monitoring the battery module in real time using the insulation monitoring device.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS

10, 100, 200: apparatus for evaluating performance of a battery module
11, 110, 210: chamber
12, 120, 220: battery module
13, 120, 230: temperature controller
14: sensor unit
140, 240: gas sensor unit
141, 241: first gas sensor unit
142, 242: second gas sensor unit
150, 250: data processing unit
160, 260: output unit
270: insulation monitoring device
18, 180, 280: charge/discharge unit

INDUSTRIAL APPLICABILITY

Further, a battery system and an apparatus for evaluating performance of the battery module according to the present invention can accurately predict the location of the battery cell where gas has been generated by introducing a plurality of gas sensor units in the battery module where a plurality of battery cells are accommodated, and comparing gas detection time points measured in the gas sensor units when gas is generated in a battery cell. Hence, the battery system and the apparatus for evaluating performance of the battery module can be usefully used in terms of development of a battery module and/or management of a developed battery module.

The invention claimed is:

1. A battery system including:
   a battery module including:
      a plurality of battery cells,
      a module case to accommodate the plurality of battery cells, and
      a plurality of gas sensor units separately positioned on an inner surface of the module case, the plurality of gas sensor units is configured to sense gas generated from the plurality of battery cells during charge and discharge, and to measure a gas detection time, and
   a battery management system (BMS) configured to control an operation and a state of the battery module, the battery management system being electrically connected to the plurality of gas sensor units and configured to receive information measured from each of the plurality of gas sensor units, and to compare the received information to thereby calculate a position of a cell where the gas has been generated.

2. The battery system of claim 1, wherein each of the plurality of gas sensor units is further configured to measure at least one selected from the group consisting of a gas type and a gas concentration value, and wherein the battery management system (BMS) is further configured to receive measurement values from the plurality of gas sensor units, which are separately positioned, and to compare the received measurement values to thereby calculate the position of the cell where the gas has been generated.

3. The battery system of claim 1, wherein the battery management system (BMS) is further configured to inform a user of a damaged battery cell if a value measured by at least one of the plurality of gas sensor units reaches a value.

4. The battery system of claim 1, wherein the module case further includes a plurality of gas discharge units, and wherein each of the plurality of gas sensor units is individually arranged at a position adjacent to each of the plurality of gas discharge units.

5. The battery system of claim 4, wherein each of the plurality of gas discharge units includes a first gas discharge unit positioned at a first side surface of the module case, and a second gas discharge unit positioned at a second side surface facing the first side surface.

6. The battery system of claim 1, further including an isolation resistance sensor unit positioned at the inner surface of the module case, the isolation resistance sensor unit is configured to measure an isolation resistance of the battery module, and to transmit a measurement value to the battery management system (BMS).

7. The battery system of claim 1, wherein the battery system includes a battery pack for a vehicle or an energy storage system (ESS).

8. An apparatus for evaluating performance of a battery module, the apparatus comprising:

a chamber;

a temperature controller positioned inside the chamber and configured to control an average temperature of an inside of the chamber to be in a range of 60 to 100° C.;

a battery module including a module case, which is mounted inside the chamber and configured to accommodate a plurality of battery cells, and a plurality of gas sensor units which are separately positioned on an inner surface of the module case, the plurality of gas sensor units are configured to sense gas generated inside the module case, and to measure a gas detection time; and a data processing unit, which is electrically connected to the plurality of gas sensor units, and configured to receive gas detection time measured by each of the plurality of gas sensor units, and to compare the received gas detection time, to thereby predict a damaged battery cell among the plurality of battery cells.

9. The apparatus of claim 8, wherein the battery module further includes a first gas discharge unit and a second gas discharge unit on a side surface of the module case, and wherein first and second gas sensor units are arranged on the first gas discharge unit and the second gas discharge unit, respectively.

10. The apparatus of claim 9, wherein the first gas discharge unit is disposed on a first side surface of the battery module, and wherein the second gas discharge unit is disposed on a second side surface facing the first side surface.

11. The apparatus of claim 8, further comprising an isolation resistance sensor unit, which is positioned on the inner surface of the module case, the isolation resistance sensor unit is configured to measure an isolation resistance of the battery module, and to transmit a measured isolation resistance value to the electrically connected data processing unit.

12. A method of evaluating performance of a battery module using the apparatus according to claim 8, the method comprising:

mounting the battery module, which includes the plurality of battery cells in the module case, on the chamber;

generating the gas inside the battery module by adjusting an inner temperature of the chamber having the battery module mounted thereon to be in a range of 60 to 100° C.;

measuring the gas detection time including sensing the gas generated inside the battery module by the plurality of gas sensor units present in the battery module; and predicting the damaged battery cell among the plurality of battery cells by comparing result values obtained by each of the plurality of gas sensor units.

13. The method of claim 12, wherein the generating of the gas is performed at a temperature of 70 to 90° C. for 6 to 12 days.

14. The method of claim 12, wherein the measuring of the gas detection time further includes measuring, by the plurality of gas sensor units, at least one selected from the group consisting of a gas type and a gas concentration value.

15. The method of claim 12, wherein the predicting of the damaged battery cell further includes determining whether an electrolyte solution has been leaked by measuring an isolation resistance inside the battery module.

* * * * *